US008019882B2

(12) United States Patent
Rao et al.

(10) Patent No.: US 8,019,882 B2
(45) Date of Patent: Sep. 13, 2011

(54) CONTENT IDENTIFICATION FOR PEER-TO-PEER CONTENT RETRIEVAL

(75) Inventors: Ravi T. Rao, Redmond, WA (US);
Khaja E. Ahmed, Bellevue, WA (US);
R. Scott Briggs, Redmond, WA (US);
Scott A. Plant, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/163,024

(22) Filed: Jun. 27, 2008

(65) Prior Publication Data
US 2009/0327505 A1 Dec. 31, 2009

(51) Int. Cl.
*G06F 15/16* (2006.01)
(52) U.S. Cl. ........ 709/230; 709/231; 709/247; 709/203; 725/86; 725/87; 725/105
(58) Field of Classification Search .................. 709/230, 709/203, 218, 222
See application file for complete search history.

(56) References Cited

U.S. PATENT DOCUMENTS

| 7,203,741 | B2 | 4/2007 | Marco et al. | |
|---|---|---|---|---|
| 2003/0191946 | A1 | 10/2003 | Auer et al. | |
| 2003/0204613 | A1 | 10/2003 | Hudson et al. | |
| 2006/0149806 | A1 | 7/2006 | Scott et al. | |
| 2006/0168054 | A1 | 7/2006 | Burkhart et al. | |
| 2006/0168510 | A1 | 7/2006 | Bryar et al. | |
| 2006/0265402 | A1* | 11/2006 | Edmond et al. | 707/10 |
| 2007/0233879 | A1 | 10/2007 | Woods et al. | |
| 2007/0299820 | A1 | 12/2007 | Bushmitch et al. | |
| 2008/0133906 | A1* | 6/2008 | Parkinson et al. | 713/156 |
| 2009/0041253 | A1* | 2/2009 | Chen et al. | 380/282 |
| 2010/0031000 | A1* | 2/2010 | Flynn et al. | 711/216 |

OTHER PUBLICATIONS

Gibson, et al., "Adaptive Web-page Content Identification", Proceedings of the 9th Annual ACM International Workshop on Web Information and Data Management, Workshop On Web Information and Data Management, ACM, 2007, pp. 105-112.

Nakayama, "Modeling Content Identification from Document Images", Proceedings of the Fourth Conference on Applied Natural Language Processing, Applied Natural Language Conferences, 1994, pp. 22-27.

Haitsma, et al., "Robust Audio Hashing for Content Identification", Proceedings of the Content-Based Multimedia Indexing, 2001, pp. 8.

* cited by examiner

*Primary Examiner* — Jude J Jean Gilles (57) ABSTRACT

Described is a technology in which client content requests to a server over a wide area network (WAN) are responded to with hash information by which the client may locate the content among one or more peer sources coupled to the client via a local area network (LAN). The hash information may be in the form of a segment hash that identifies multiple blocks of content, whereby the server can reference multiple content blocks with a single hash value. Segment boundaries may be adaptive by determining them according to criteria, by dividing streamed content into segments, and/or by processing the content based on the content data (e.g., via RDC or content/application type) to determine split points. Also described is content validation using the hash information, including by generating and walking a Merkle tree to determine higher-level segment hashes in order to match a server-provided hash value.

18 Claims, 6 Drawing Sheets

CONTENT IDENTIFICATION FOR PEER-TO-PEER CONTENT RETRIEVAL

BACKGROUND

In an enterprise networking environment, wide area network (WAN) links, such as from a branch office to a data center/central server location, suffer from low bandwidth/high latency problems. Such slow links often result in poor application performance and a lot of user frustration, as well as reduced productivity. For example, applications and users often need to wait for file data, wait for Internet and intranet content, and so forth.

Various server caching mechanisms have been used to avoid slow WAN links. However, such caches have their own issues, such as needing to handle security, handling only certain protocols, needing to cache full pages in anticipation of user demand, and so forth. In general, any improvement in reducing WAN usage in retrieving content is highly desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which hash information corresponding to content is returned in response to a request for content from a network client coupled via a wide-area network. The hash information includes a segment hash that may be used to locate and identify at least one content block within the set of content blocks identified by the segment hash, and which is maintained on at peer coupled to the client over a local area network.

In one aspect, a requesting machine requests content from a server over a wide area network, and in response receives segment information. Content retrieval logic uses the segment information to locate and retrieve at least part of the content, a single block for example, from at least one source coupled to the requesting machine via a local area network connection.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards various content identification schemes that facilitate efficient peer-to-peer content retrieval, that is, from machines connected to one another via a local area network (LAN) rather from a remote server connected via a WAN. As will be understood, the various content identification schemes described herein generally reduce the amount of hash information that a server needs to communicate in order for a requesting client to locate content on a peer machine. In one aspect, a content identification scheme may be used that defines the units of discovery in a peer-to-peer content retrieval system. At the same time, such schemes may work at different levels, e.g., at a protocol level or independent of protocols, and an application level or independent of application, and so forth. One such level is a content level that reduces the amount of cache misses by splitting content into blocks at content-dependent split points thereby providing improved content "churn" resistance.

It should be understood that any examples set forth herein are non-limiting examples, e.g., content split points may be determined by remote differential compression, but any type of splitting mechanism may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and content identification or retrieval in general.

Figure 1:
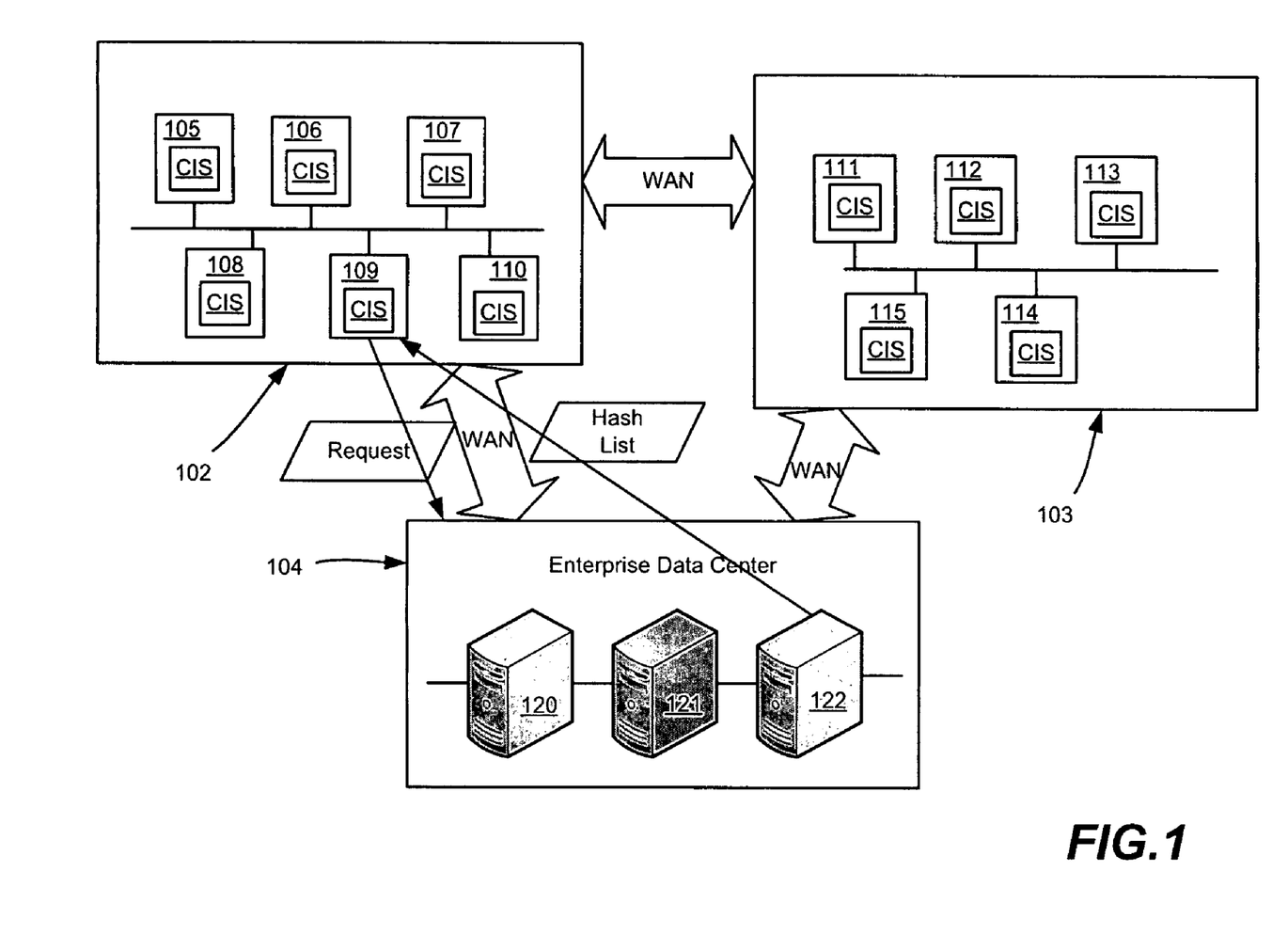
FIG. 1 is a block diagram representing an example enterprise having branches of locally networked machines configured for content retrieval from peers, in which the branches are coupled to an enterprise data center over a wide area network.

As generally represented in FIG. 1, there is shown an enterprise network containing two branch offices or the like, labeled branches 102 and 103, and a datacenter 104 (or headquarters or the like). A datacenter is typical in some enterprises such to control security, provide a central maintenance location, and the like. As can be readily appreciated, any practical number and/or configuration of branch offices and/or datacenters may be present in a given enterprise network.

In general, each of the branches 102 and 103 are connected to the datacenter 104 (and typically to one another) over a wide area network (WAN) communications link that is relatively low in bandwidth/high in latency relative to the network connection link (e.g., local area network or LAN) connection between machines within a branch. As represented in FIG. 1, the branch 102 contains machines connected via a LAN link, the branch 103 contains machines 111-115 connected via a LAN link, and the datacenter 104 contains server machines 120-122 connected via a LAN link. As can be readily appreciated, any practical number and/or configuration of machines may be present within a given branch and/or datacenter.

As described below, each of the machines that participates in the peer-to-peer content retrieval system includes a content identification subsystem, or CIS. As will be understood, the clients may poll peers looking for content, and/or in one optional alternative, each client (or at least some of them) may include a distributed hash table or other data structure to help locate content.

In general, the content identification and retrieval system as represented in FIG. 1 enables retrieval of content from other clients (referred to herein as peers, particularly those in the same branch, regardless if such peers are actually servers or other clients) instead of retrieving that content from a server over a WAN link. As will be understood, a main content server is still involved, but rather than serving content (at least not always), is configured to provide hash values that identify pieces of the content to the requesting client, which can then retrieve some or all of those pieces from peers. In an enterprise branch office, such technology reduces WAN bandwidth usage and increases application responsiveness. On the Internet, such technology reduces egress costs for content publishers.

Thus, in enterprises, the content identification and retrieval system reduces WAN expense links since clients can retrieve content from other clients in the branch office instead of the remote datacenter/headquarters, thereby providing increased application responsiveness through faster downloads. The system also facilitates accelerated delivery of IPsec traffic. As will be understood, the content identification and retrieval system may be integrated with protocol stacks for existing protocols such as HTTP and SMB, so that any application built on top of these protocol stacks automatically works with the system.

Figure 2:
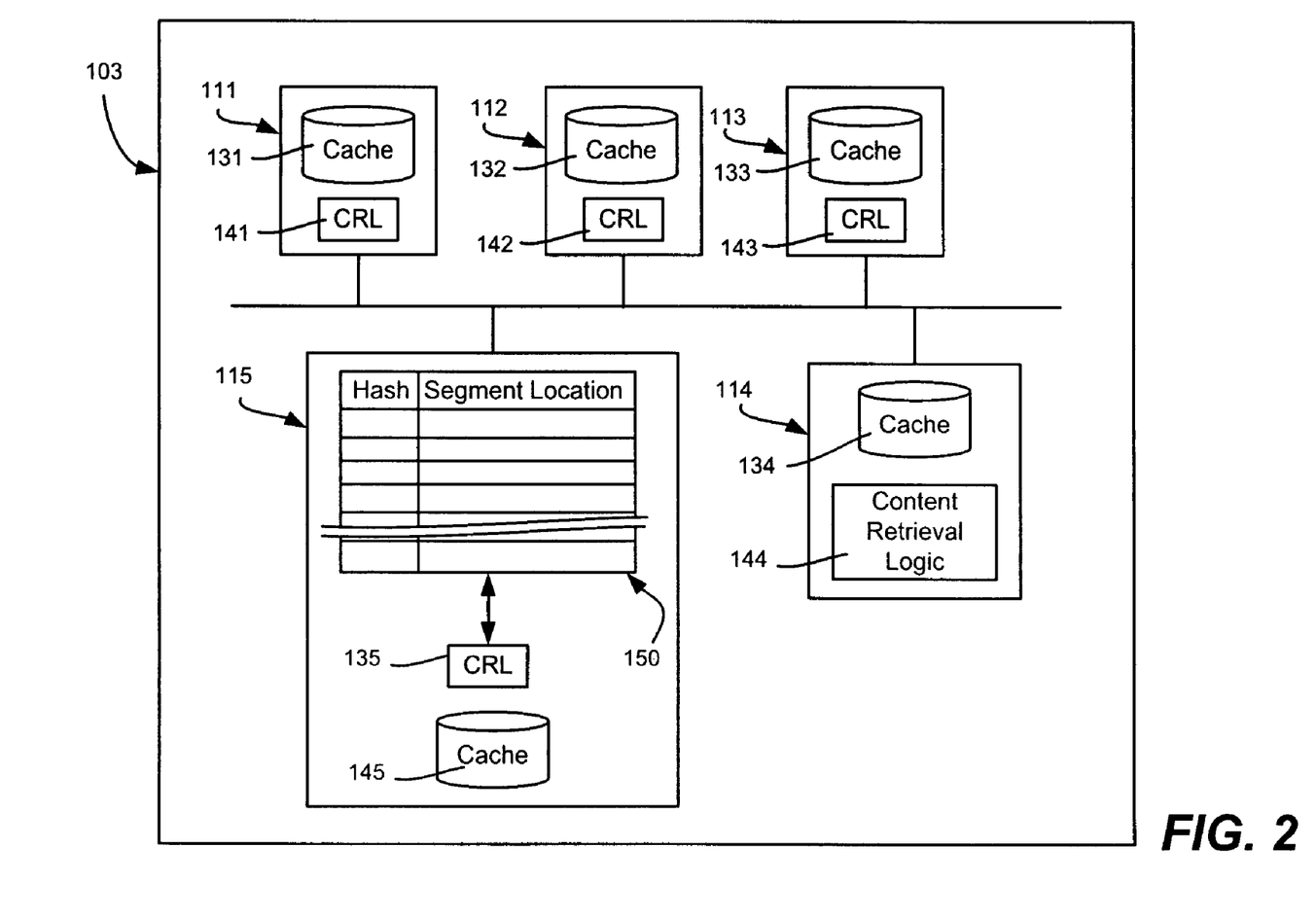
FIG. 2 is a block diagram representing an example branch office network having branches of locally networked machines configured for content retrieval from peers.

As generally represented in FIG. 2, in which the machines 111-115 of branch 103 are shown, each content identification subsystem includes a cache and content retrieval logic, or CRL. Thus, the machines 111-115 include caches 131-135, respectively, and content retrieval logic 141-145, respectively.

Also in FIG. 2, one or more machines such as the machine 115 may have access to a data structure 150 (e.g., table) that maps hash values to segment locations in peers. The data structure 150 is shown as being incorporated into the machine 115, but as can be readily appreciated, may be maintained on an external network storage device.

In one implementation, each of the segment locations in the data structure 150 is within one of the caches 131-135 of the branch 103. However, it is feasible to have a mapping to other caches, such as to a location that provides data faster than data served over the WAN link, but not as fast as a LAN peer-to-peer connection.

Content identification in a content retrieval system may be designed such that content may be identified independent of the actual name of the content itself (e.g., a URL, filename and so forth). This allows for cross-protocol optimizations. At the same time, the scheme may be configured to resist churn, e.g., such that small changes in content do not change all hashes in the content itself. Also, the number of hashes returned is (ideally) relatively small so that a client does not have to retrieve a large number of hashes from the server before it is able to get content from peer clients. The list of such hashes sent from a server may be compressed itself.

Various ways to split content into blocks are feasible. For example, a simple way to divide content is to provide equally-sized blocks, obtain a hash value (signature) for each block, and then associate the signature with that block. When a client requests content (to which the client has access rights) from a server, the server returns the corresponding hashes in some list or other form. Note that typically hashes are sent on the same channel as the content is or would be sent, so that hashes have the same level of protection (e.g., encryption) as the content because the hashes give rights to the content. When received, the client can then use the hash values to look for the content among one or more peers, only requesting actual content from the server when no peer has the matching content (e.g., to fill in any or all missing blocks). As described above with reference to FIG. 2, to help locate the content segments that contain the content blocks of interest, the client may access a data structure 150 (e.g., a distributed hash table) that maps the hashes to a peer's location (or peers' locations).

Figure 3:
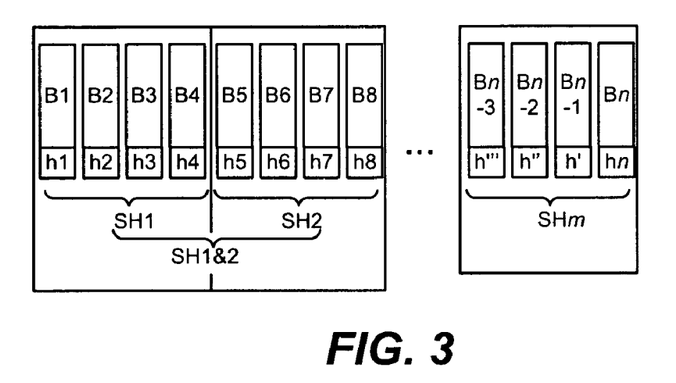
FIG. 3 is a representation of using segment hashes to identify blocks of content that are identified by block hashes, or other segment hashes.

Another content identification mechanism/scheme described herein is generally represented in FIG. 3, in which a segment of multiple blocks is identified by a segment hash obtained from the server. Although FIG. 3 shows segments of four blocks, it is understood that any practical number of blocks may be in a given segment, and the segments may have different numbers of blocks. A byte range within the segment of blocks provides the starting and ending points of the requested content, (for example, although other schemes may be used).

Thus, it is seen in FIG. 3 that blocks B1-B8 have block hashes h1-h8 and so on up to block Bn with segment hash hn. Block hashes h1-h4 are combined into a segment hash SH1; block hashes h5-h8 are combined into a segment hash SH2, and so on. Further, it should be noted that segments may be grouped together into a higher-level segment, e.g., in a hierarchy, as represented by segment hashes SH1 and SH2 being combined into a segment hash SH1&2.

In this manner, the amount of hash information transmitted by the server is reduced. However, as can be readily appreciated, there is a tradeoff between segment size and cache misses, e.g., the larger the segment size, the greater the chance of a cache miss as content within that segment is more likely to change. Thus, for example, frequently changed content may have small segments, while rarely changed content may have large segments.

Thus, another content identification mechanism/scheme may use adaptive segments/blocks rather than fixed-sized ones, based on some criterion or criteria. For example, as mentioned above, segment size for any set of content may be determined based on actual and/or predicted frequency of content changes. File size may also be considered, such as to give small amounts of content (e.g., a 300 KB file) small segments relative to larger amounts of content (e.g., 2.5 MB file) which are given larger segments. For example, segment size may be based on a percentage of the total file size.

Yet another aspect relates to content that is streamed such that there is no known end that can be used in determining how to split content. The end may be predicted, in which event splitting may be based on the prediction. However, if generally unpredictable such that the server cannot consider an estimate of content's size, the server may split the content into blocks and/or segments as it is streamed, such as according to some limit, e.g., a size limit. Metadata associated with the content or the content itself may be examined in determining a split point. Remote differential compression (described below) may also be used to determine split points once enough such content has been streamed.

Another content identification mechanism/scheme is based on splitting content according to similarities detected in the content with other content, such as via a remote differential compression algorithm. Remote differential compression is known in general, and will thus only be summarized herein except as it relates to its use in splitting content for content identification/retrieval.

By way of summary, remote differential compression divides a file's data into chunks by computing the local maxima of a fingerprinting (hash) function that is computed incrementally, at every byte position in the file. A sliding hash window is used across the file, while examining the sequence of fingerprint function values over a given range of bytes. When a fingerprint function value is a local maximum within the range, its byte position is chosen as a split point.

In this manner, any sufficiently large piece of content may be split; that is, given a buffer with data, content identification starts by generating logical split points (using a remote differential compression algorithm) in the buffer to create segments, and computing SHA256 segment hashes. Note that one benefit of using remote differential compression hashes is that it provides a hashing scheme that is resistant to small changes in large content, or churn.

Figure 4:
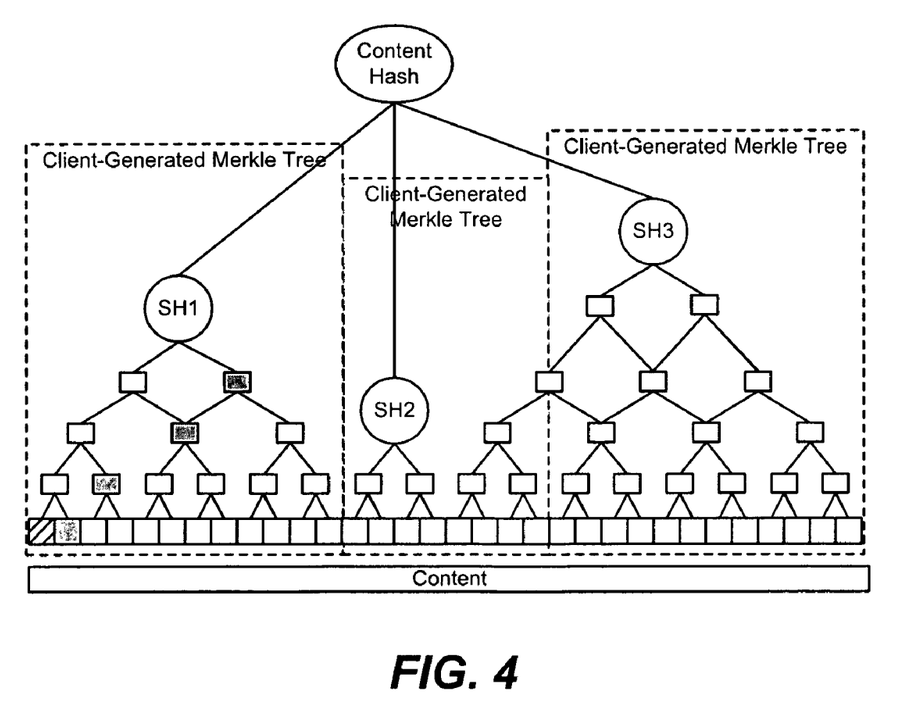
FIG. 4 is a representation of a data structure (Merkle tree) used to compute segment hashes to validate a block of content.

In another aspect, FIG. 4 shows a number of segment hashes, labeled H1, H2, H3 and the content hash, arranged in a tree structure. More particularly, when requesting corresponding content, these hashes {H1, H2, H3 and the content hash} are returned from the server to the client. As described herein, each segment hash forms the root of a Merkle tree generated locally on the client, as represented in FIG. 4. As will be understood, using Merkle hash trees for each block hash helps in reducing the size of the hash list that needs to be sent from the server to the client.

Note that when content is retrieved by a client from a peer, the client needs to validate the data received against the hashes received from the server, and any hashes received from the peer. More particularly, for Merkle trees, the retrieving client tells the source peer what hashes it needs in order to chain the requested data up to something the retrieving peer already trusts. The client receives an (untrusted) chain starting at a peer-supplied data block, up through peer-supplied intermediate hashes (internal nodes within the Merkle tree), up to the top server-provided trusted root hash. Before the data block or blocks received from this peer are provided up to the requesting application, the chain is validated. If the entire chain successfully validates then everything in the chain becomes trusted, that is, the data blocks and the intermediate nodes. When successfully validated, the source peer-provided hashes are promoted to trusted by the client, whereby they may be used for subsequent validations.

As this process repeats several times, the client ends up with a tree containing possibly many trusted internal nodes. This can be communicated in subsequent requests so s peer knows that it is not necessary to provide a chain all the way to the root node. The chain only needs to reach the lowest trusted node that the client already has.

Note that hashes are not only used for discovery, but also as units of authorization indicating a client has the access rights to obtain the content from the peers, as well as for integrity checking (that is, validation) of the content when received from a peer. Note that already protected content (e.g., protected via digital rights management, signed and so forth) may not need to be validated.

To this end, blocks retrieved from peer caches need to be validated, which may be done on block boundaries so as to return content quickly to an application, but when segmenting is used, content location discovery is done on segment boundaries to reduce network traffic. Thus, with segmenting, a hash for that specific block in the segment is not returned by the server. For this purpose, a Merkle hash tree (or other suitable data structure) is constructed by the client.

The root of the Merkle tree is the segment hash retrieved from the server, e.g., H1 in FIG. 4). These segment hashes may be combined into lower-level segment hashes and so on, as in FIG. 3, until the block hashes (leaf nodes) are reached. The associated segment is thus broken down into some size (e.g., 64 KB) blocks, with a hash value computed for each (e.g., SHA-1 hash). If a client downloads a 64 k block from a peer (shown in FIG. 4 as corresponding to the leftmost, striped block in the content in the figure above), then the peer returns the block's content. In addition, in this scheme, the peer also returns block validation data, which includes the hash values corresponding to the shaded blocks/segments in FIG. 4, that is, hashes for the nodes under the H1 hash.

Having these peer-provided hashes allows the client to compute the associated root hash H1 of the Merkle tree and ensure that it matches with the segment hash for H1 that was received from the server. This validates the content by helping ensure that the block received from a peer is not tampered with or otherwise corrupted. In other words, the client can compute the hash of the requested block (the one that is striped in FIG. 4), and combine the result with the hash of the shaded block at the same level in the tree to determine the hash of the segment above. With this higher hash, the client can use the peer-provided (shaded) hash for that higher level to compute the hash of the segment above that level, and so forth, up to the H1 segment hash. If this computed segment hash matches the server-provided segment hash, the requested block provided by the peer, as well as any of the shaded hashes provided by the peer and utilized in the above described calculations, are proper, otherwise they are not.

Figure 5:
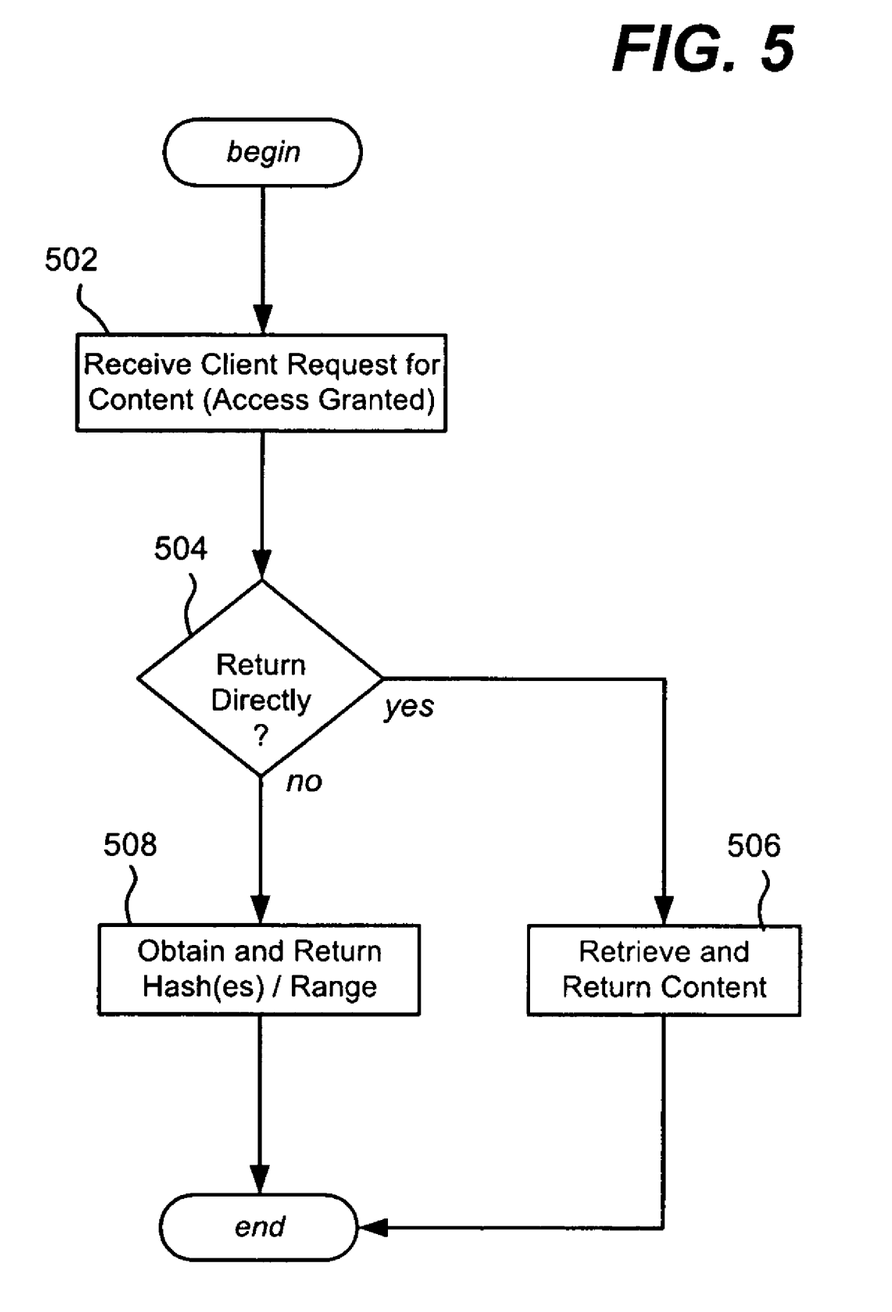
FIG. 5 is a flow diagram showing example steps that may be taken by a server to handle a client request for content.
Figure 6:
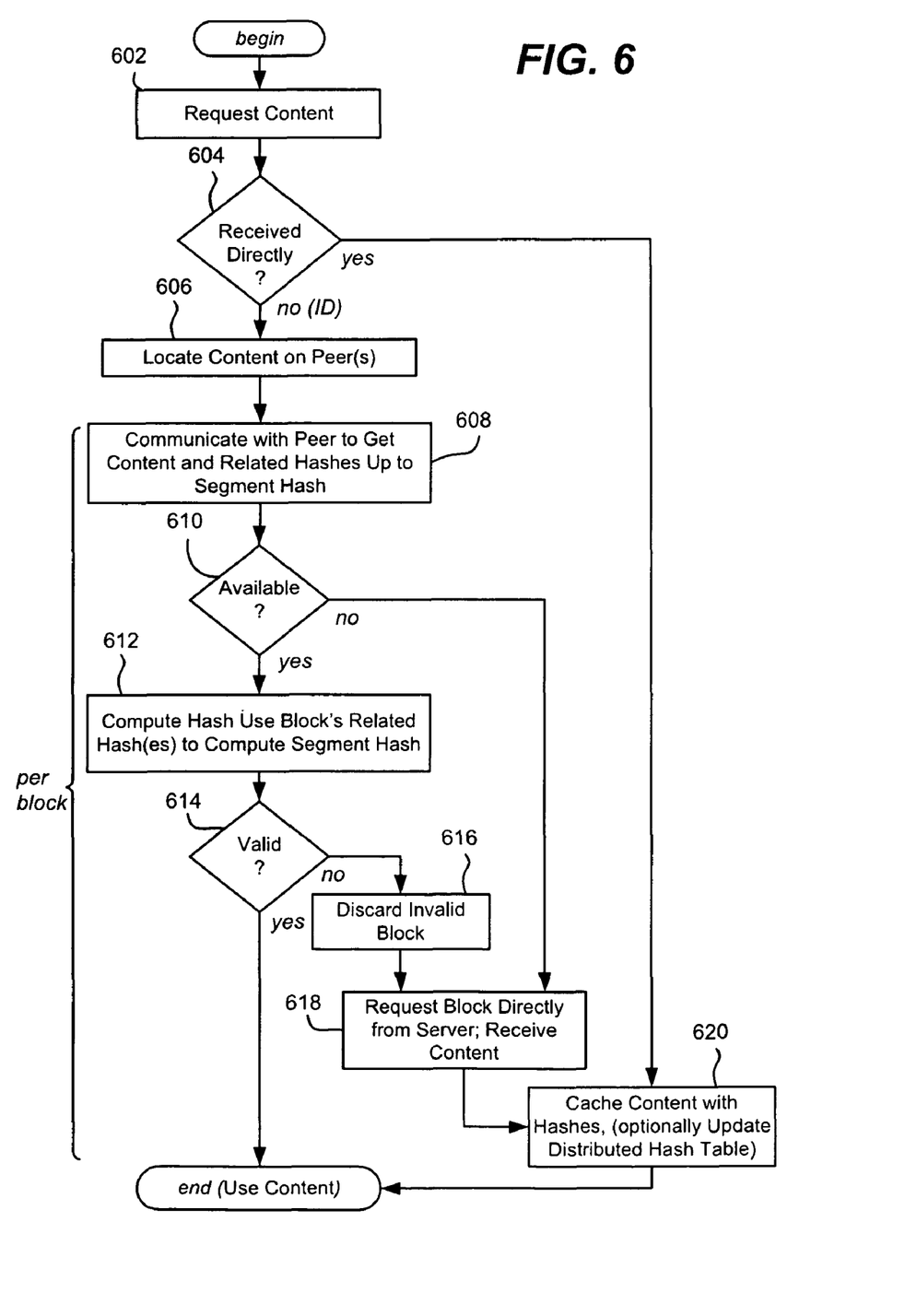
FIG. 6 is a flow diagram showing example steps that may be taken by a client to request content from a server and/or locate blocks of content from one or more peer machines.

FIG. 5 summarizes the various operations in a flow diagram from the perspective of a server, along with some possible optimizations. FIG. 6 summarizes operations from the perspective of a client, such as using the Merkle tree mechanism to verify a block via its segment hash or hashes.

At step 502 of FIG. 5 and step 602 of FIG. 6, a client requests content from a server (which the client has rights to access and so forth). As represented by steps 504 and 604 of FIGS. 5 and 6, the server may decide to return the content directly (step 506), rather than return identifiers of the content. For example, if the requested content is below a certain threshold size, the server may decide to return it directly rather than consume other resources/deal with the overhead involved when using the content retrieval identification system; note that the threshold size may be variable, such as based on current latency. As another example, the server may maintain state, such as per branch, by which the server knows the likelihood of the requested content being cached on the peers of each branch. For example, content that has never been provided to that branch, or has been provided very long ago such that it has likely been removed from a peer cache, may be sent directly.

Another time that content may be sent directly is when the client requests that it be sent that way. For example, a client may have already requested content and received content identifiers, but found that the content (or a part thereof) was not available from a peer.

Although not specifically represented in FIG. 5, it is also feasible for the server to send some sampling of hashes to the client, rather than the full hash list. Based on whether the samples (or some percentage thereof are located, the server can decide whether to send the content, send the full hash list, or send more samples (or some combination of content and hash data).

For requested content sent and received directly (step 618), the client may cache it at step 620 of FIG. 6, along with any hash information for that content (segment and/or block), and update the distributed hash table (the data structure 150, if in use) that the client has that content cached. Note that the client may not cache some of the content, such as if instructed by the server not to cache it, or if the content is deemed too small to be cached; e.g., sensitive and/or very small content may not be cached. In any event, the client may then use the content for the purpose for which it was requested. Note that the client may receive some content directly, and some from a peer, in which event the content may not be useable until other blocks are received.

As represented by step 508 of FIG. 5, for requested content that is not returned directly, the server computes (or looks up if pre-computed) the appropriate content identifier (ID), that is, a set of one or more hash values, for blocks, segments and so forth as appropriate for the scheme in use. Other data such as the byte range of the content within a segment may be determined or returned at this time.

As represented by step 606 of FIG. 6, for content for which an identifier was received instead of the content, the client attempts to locate the content on one of the peers. The client may (optionally) access the data structure 150 to find out where the content may be located. Note that the client may first check its own cache, if the client maintains a hash ID-to-its own content mapping.

Steps 608 and those thereafter are generally per-block operations, and can at least to some extent be performed in parallel for different blocks, e.g., to request, receive, validate and assemble blocks from peers and/or the server in parallel.

Step 608 represents communicating with the peer to get the content for a block, along with any related hash data the client may need to validate that block, as described above. Note that for a given block, step 608 may be skipped if the distributed hash table data structure 150 indicates that no such identified block (or segment) is cached, although the client may still attempt to poll peers.

If the block is not available, e.g., no peer had the block, or the peer is not communicating or has discarded it from its cache (and the hash table data structure, if any, has not yet been updated), the client requests the block directly via step 618.

If the content is available, it is returned from the peer, whereby the requesting client validates it via steps 612 and 614 in these example steps, such as described above. If not valid, the client basically discards it (step 616) and requests it directly from the server (step 618).

The above-described technology may operate on a level that is independent of content, protocol, application. However, as described above with reference to remote differential compression, the content may factor into the split points for segments and/or blocks.

Further, information known about the content, application and/or protocol may be used to further enhance efficient operation of the identification and retrieval technology described herein. For example, if the content is known to be an image, the split points may be determined based on image boundaries, the compression scheme (if any) used to encode the image, and so forth. Similarly, if the content is a document, knowledge of the application associated with that image may be used in determining split points, e.g., a document may be split into text blocks and annotation blocks, so that, for example, changed annotations will not change the hash values associated with the text portion. If the content is an executable that is seldom changed, a relatively very large hash segment may be used.

Further, consideration may be given to the ordering of hashes sent in the list from the server. For example, if there is some content that an application needs to first read in order to operate with the rest of the content, that hash may be placed first in the list. Hashes may be arranged on the likelihood of content being requested, such as based on statistics of previous read requests, and/or a small hash list may be given to handle the first part of content because most users tend to only look only at that first part of the content and never bother with the rest.

Exemplary Operating Environment

Figure 7:
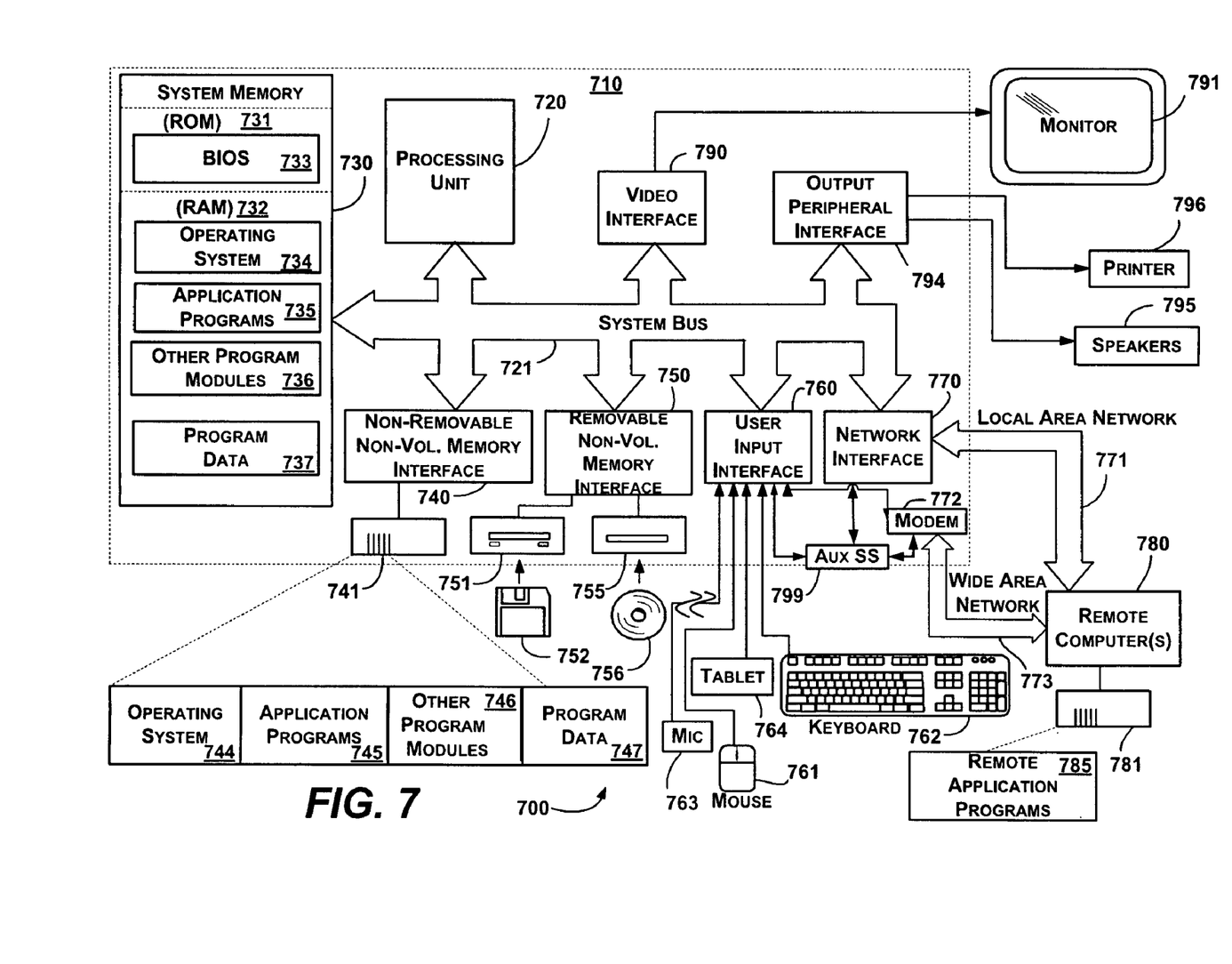
FIG. 7 shows an illustrative example of a computing environment into which various aspects of the present invention may be incorporated.

FIG. 7 illustrates an example of a suitable computing system environment 700 on which the examples and implementations of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving a request for content from a network client coupled via a wide-area network; and returning hash information to the client in response to the request, the hash information comprising segment information including at least one segment hash that is useable to identify at least one content block within a segment of blocks that includes the content, at least some of the content being maintained at a peer machine coupled to the client over a local area network, the at least one segment hash being further useable with a content hash of a first content block to validate the first content block, the first content block being maintained at the peer machine, the at least one segment hash being based on content of the segment, the content hash being based on content of the first content block.

2. The method of claim 1 further comprising, determining a segment boundary corresponding to a segment in the hash information.

3. The method of claim 2 wherein determining the segment boundary comprises evaluating size of the content, likelihood the content will change, or both size of the content and likelihood the content will change.

4. The method of claim 2 wherein determining the segment boundary comprises dividing streamed content into segments.

5. The method of claim 2 wherein determining the segment boundary comprises processing the content based on data of the content to determine a split point for the segment boundary.

6. The method of claim 5 wherein processing the content comprises running a remote differential algorithm.

7. The method of claim 1 further comprising, receiving another request for other content, determining that the content is to be served directly, and directly serving the other content over the wide-area network in response to the other request.

8. The method of claim 7 wherein determining that the content is to be served directly comprises, evaluating a size of the other content to be served, or evaluating state information as to whether the other content has previously been served over the wide area network, or both evaluating a size of the other content to be served and evaluating state information as to whether the other content has previously been served over the wide area network.

9. The method of claim 1 wherein the segment information in the hash information is useable to obtain at least some of the requested content from the peer machine.

10. In a computing environment, a system comprising, a requesting machine that requests content from a server over a wide area network, and in response receives segment information, the requesting machine including content retrieval logic that uses the segment information to locate and retrieve at least part of the content from at least one source coupled to the requesting machine via a local area network connection, the segment information including a first segment hash for a first segment, the at least part of the content including a first content block, the first content block being part of the first segment, the requesting machine validating the first content block using the first segment hash and a first block hash of the first content block, the first segment hash being based on content of the first segment, the first bock hash being based on content of the first content block.

11. The system of claim 10 wherein the segment information contains at least one segment hash that is a combination of at least two other segment hashes.

12. The system of claim 10 wherein the requesting machine corresponds to a branch including a plurality of other machines coupled to the requesting machine via the local area network, and wherein the source comprises a peer machine of the plurality.

13. The system of claim 10 further comprising a data structure coupled to the requesting machine, the requesting machine accessing the data structure to locate the source based on the segment information.

14. The system of claim 10 wherein the segment information used to locate the source authorizes the requesting machine to retrieve the content from the source, and wherein the requesting machine further uses the segment information for content validation.

15. One or more computer storage media having computer-executable instructions, which when executed perform steps, comprising:
   requesting content from a server coupled over a wide-area network; and
   receiving hash information in response to the request, the hash information containing segment information, the segment information including a segment hash for a segment of content;
   using the segment information to locate a source of the content that is coupled to a requester of the content via a local area network;
   receiving the content from the source, the content including a first content block, the segment including the first content block; and
   validating the content using the segment hash and a first content hash of the first content block, validating the content including:
   (a) generating a Merkle tree having a root corresponding to a server segment hash provided in the segment information,
   (b) computing a first block hash of the content;
   (c) using the first hash and a second hash related to the content to determine a current higher-level segment hash; and
   (d) using the current higher-level segment hash for validation, including:
      (i) if the current higher-level segment hash does not correspond to a root level, using the current higher-level segment hash and another segment hash at a same level in the tree to determine a new higher-level segment hash, setting the current higher-level segment hash to the new higher-level segment hash, and returning to step (d), or
      (ii) if the current higher-level segment hash does correspond to the root level, comparing the current higher-level segment hash with the server segment hash to determine whether the content is valid.

16. The one or more computer storage media of claim 15 wherein using the segment information to locate the source of the content comprises polling among peer machines.

17. The one or more computer storage media of claim 15 wherein using the segment information to locate the source of the content comprises accessing a hash table data structure.

18. The one or more computer storage media of claim 15 wherein the segment information includes a segment that is not found at a local area network source, and having further computer-executable instructions comprising, requesting that the server directly provide content corresponding to the segment that was not found.

* * * * *